United States Patent [19]

Hegler et al.

[11] 3,994,644
[45] Nov. 30, 1976

[54] EXTRUDER HEAD FOR EXTRUDING AN OUTER TUBE OR SHEATH ABOUT AN INNER TUBE OR CABLE

[76] Inventors: Wilhelm Hegler; Ralph-Peter Hegler, both of Goethe Str. 2, 873 Bad Kissingen, Germany

[22] Filed: Dec. 4, 1974

[21] Appl. No.: 529,657

[30] Foreign Application Priority Data
Mar. 22, 1974 Germany............................ 2413877

[52] U.S. Cl. .............................. 425/112; 156/244; 264/173; 425/113; 425/133.1; 425/380
[51] Int. Cl.² ........................................ B29F 3/10
[58] Field of Search ...................... 264/176 R, 173; 425/113, 114, 133.1, 112, 376, 380, 467; 156/244, 500

[56] References Cited
UNITED STATES PATENTS

| | | | |
|---|---|---|---|
| 2,766,481 | 10/1956 | Henning........................ | 425/113 X |
| 2,893,056 | 7/1959 | Henning........................ | 425/113 |
| 3,737,260 | 6/1973 | Kaye............................. | 425/113 |
| 3,780,154 | 12/1973 | Muller et al. ................ | 425/133.1 X |
| 3,833,325 | 9/1974 | Ramsey......................... | 425/113 |
| 3,856,448 | 12/1974 | Iijima et al..................... | 425/133.1 |
| 3,860,686 | 1/1975 | Myers............................ | 425/113 X |

FOREIGN PATENTS OR APPLICATIONS
135,477  4/1952  Sweden............................ 425/192

*Primary Examiner*—Francis S. Husar
*Assistant Examiner*—Mark Rosenbaum
*Attorney, Agent, or Firm*—Burgess, Dinklage & Sprung

[57] ABSTRACT

An improvement in an extruder head for extruding an outer tubular extrusion or sheath about an inner tube or cable which extrusion head has a means for passing an inner tube or cable through the extruder head which extruder head also terminates in a generally annular passage disposed about said inner tube or cable, the improvement residing in means for feeding molten material through an introducing passage at an angle to said extruder head and then into said annular passage, dividing means in said introducing passage for dividing said molten material into a stream of U-shaped cross-section, said dividing means including a leading parting edge; a method of producing a carrier ring which carries the dividing means by passing a machining tool into the introducing passage and passing the tool along paths having progressively larger U-shaped loops.

8 Claims, 10 Drawing Figures

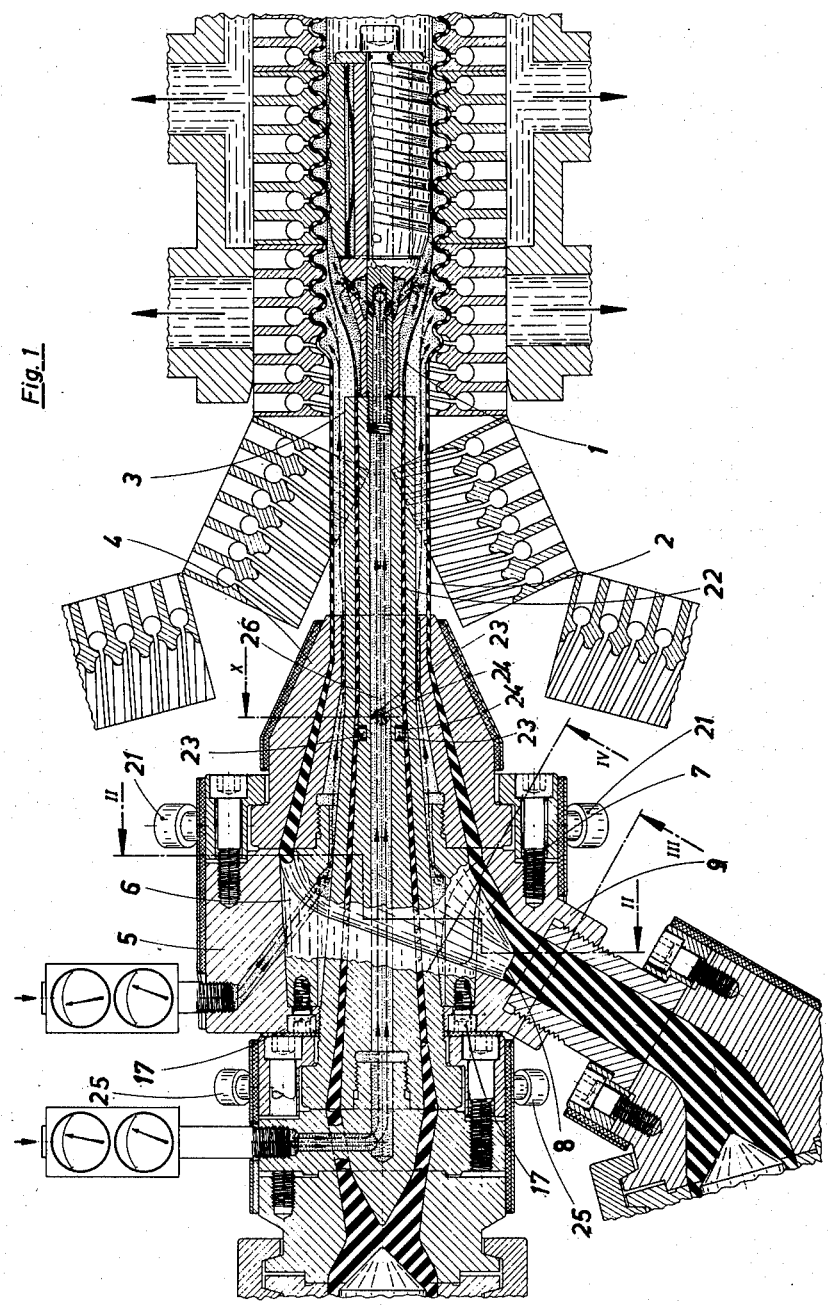

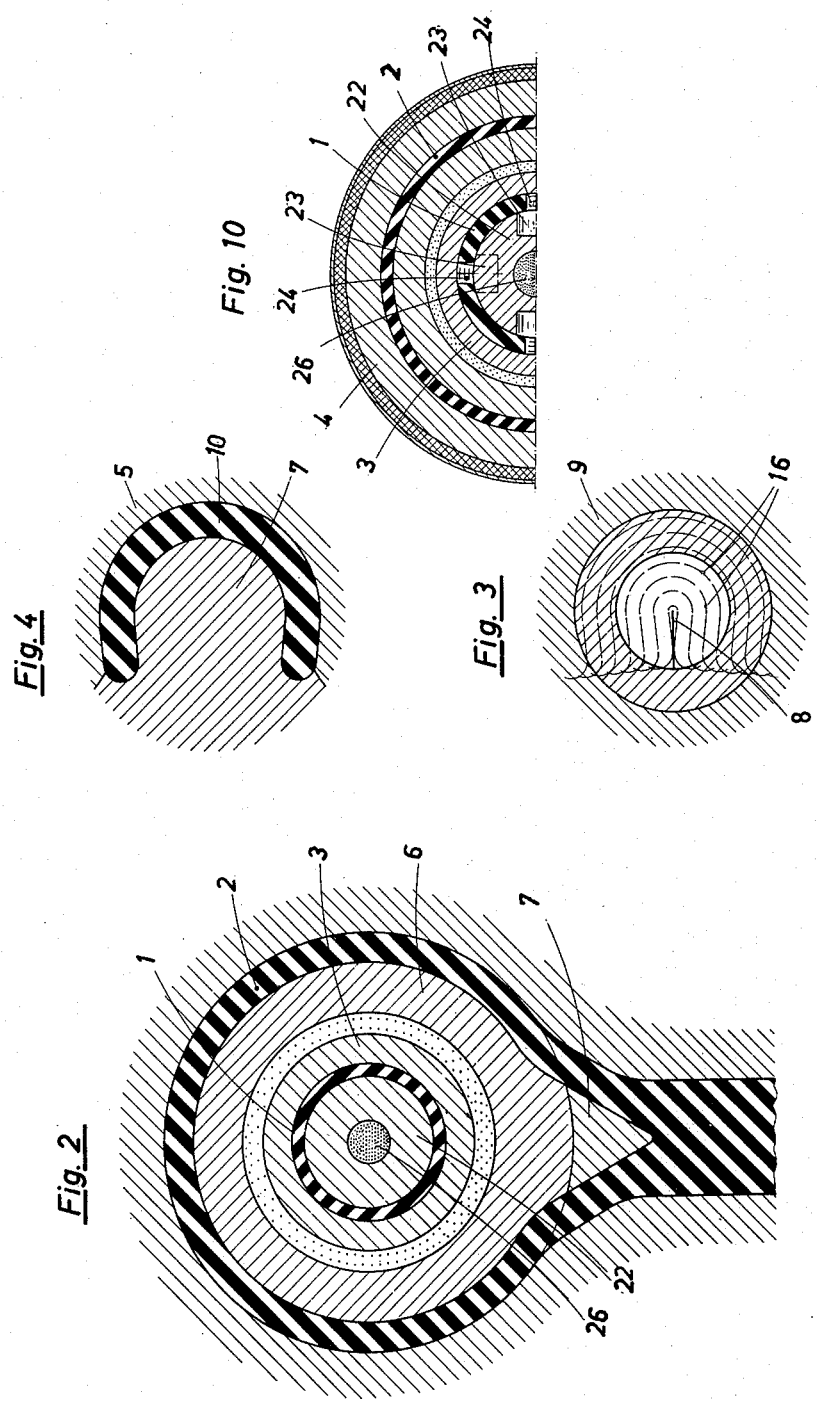

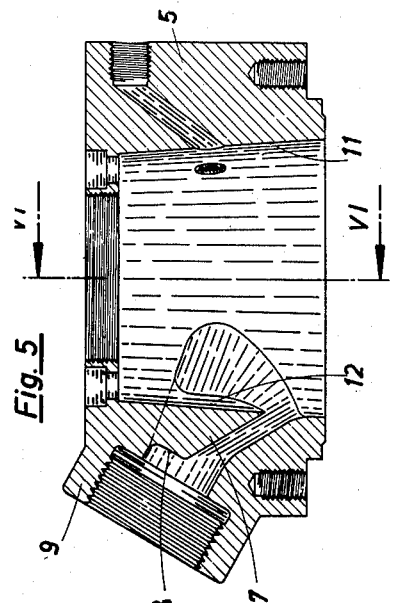
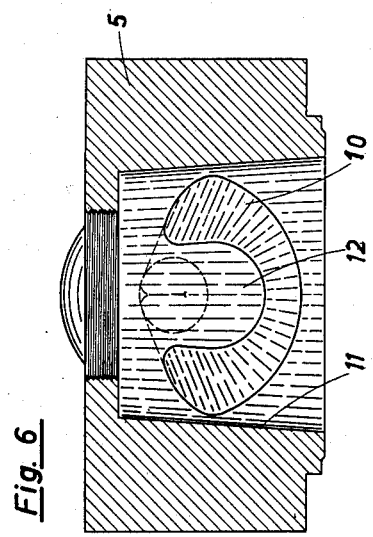
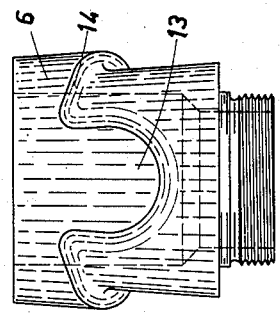
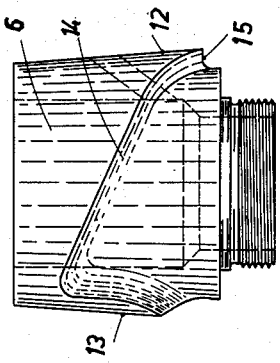
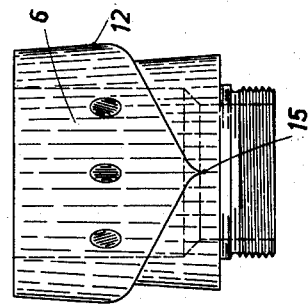

EXTRUDER HEAD FOR EXTRUDING AN OUTER TUBE OR SHEATH ABOUT AN INNER TUBE OR CABLE

BACKGROUND OF THE INVENTION

1. Field of the Invention

This invention is directed to an improvement in an extruder head utilized to form concentric tubes wherein an outer tubular extrusion or sheath is formed about an inner tube or cable. This invention is particularly directed to an apparatus for forming extruded tubes or sheaths of highly viscous synthetic material, e.g., polyvinyl chloride, about an interior inner tube or cable.

2. Discussion of the Prior Art

Extruder heads in which a stream of synthetic plastics is side fed at right angles or obliquely to the extrusion axis for the purpose of extruding a plastic outer tube or sheath about an inner tube or cable conducted axially through the extruder head are already known in the art. Double extruder heads for extruding two concentrically interposed tubes are also known in which the synthetic plastics for the outer tube is axially conducted, whereas the plastics material for forming the inner tube is cross fed from a transverse or oblique feed head into the interior of the plastics stream for forming the outer tube.

In these known types of cross or obliquely fed extruder heads a difficulty which arises in that the laterally entering plastic stream impinges upon the inner tube of the extruder head and must flow around this tube. In doing a considerable back pressure builds up. Consequently, these known types of cross or oblique feed extruder heads are suitable only for extruding synthetic plastics materials that are not very viscous in their plastically flowable state. When extruding highly viscous plastics materials, such as hard PVC, the back pressures often builds up to several hundred atmospheres. These are pressures which in practice cannot be adequately controlled so that even when using strong flanges the flange bolts yield and tear out.

It is an object of this invention, therefore, to provide an extruder head which is suitable for extruding an outer tube or sheath about an inner tube or cable which is particularly suitable for those plastics material which are highly viscous under the usual extrusion conditions. It is an object of this invention, additionally, to provide an extrusion head wherein the plastic material can still be fed to the extruder head at an angle thereby rendering it unnecessary to provide a radically different structure from those extrusion heads heretofore employed. It is another object of this invention to provide an extrusion head for extruding an outer tube or sheath about an inner tube or cable where the plastic material fed for the formation of the outer tube or sheath is fed at an angle acute to the extruder head, i.e., at an angle generally acute with respect to the flow of molten plastic material towards the exit of the extruder head.

SUMMARY OF THE INVENTION

The objects of the present invention are accomplished by an improved extruder head for the formation of an outer tube or sheath about an inner tube or cable which extruder head comprises a means for passing an inner tube or cable through an extrusion head, said extruder head terminating in a generally annular passage disposed about said inner tube or cable. The improvement resides in that the extruder head comprises means for feeding molten material through an introducing passage at an angle into said extruder head and thence into said annular passage, the extruder head having a dividing means in said introducing passage for dividing said molten material into a stream of U-shaped cross section, said dividing means including a leading parting edge. Preferably, the introducing passage is disposed at an acute angle to the generally annular passage, say an angle between 30° and 90°.

In accordance with the present invention, problems experienced in the art of extruding outer tubes of highly viscous material about inner tubes or cables are solved by providing a dividing means at the juncture where the introducing passage meets the generally annular passage. The dividing means of the present invention serves to form the incoming molten material into a stream of a general U-shaped cross section. Inwardly disposed of the parting edge is an insertion means which assists in the flow of the molten material about an internal member whereby the mass is formed into an annular shape at a point proximate the point where the introducing passage meets the annular passage. The assembly of the invention avoids those problems experienced when it is attempted to form an outer tube or sheath of a highly viscous plastic material. These materials are entirely compatible with the extruder head of the invention whereby the creation of high back pressures is avoided.

According to the invention the outer synthetic plastics stream enters from the side at an angle to the axis, e.g., an acute angle of 30° to 90°, of the extruding die and is divided by a flow splitter formed with a dividing edge into a stream of U-shaped cross section. This flow splitter is conveniently a body having the configuration of one half of an axially divided cone with adjoining inclined surfaces meeting at the dividing edge which also appears as one half of an axially divided solid cone. This flow splitter cuts the plastics stream without giving rise to creation of substantial back pressure and the divided plastics stream can then be conducted around the tube or cable and reclosed to a complete ring or tube.

To permit an extruder head containing such a flow splitter to be produced the extruder head preferably comprises an outer carrier ring having a lateral entry connection containing the flow splitter and its dividing edge, and an inner insertion which is formed with a U-shaped backing surface for the flow splitter. The inside of the outer carrier ring and the peripheral surface of the insertion are preferably generally cone-shaped so that they fit together precisely. For further conducting the plastics stream after it has been divided by the flow splitter the insertion preferably has a surface which adjacent the backing surface for the flow splitter is recessed and adapted to conduct the two sides of the plastics U-section stream so that they are recombined in the form of an annular section stream. Preferably the carrier ring and the flow splitter are of integral construction since this eliminates joints in which the plastics could lodge.

The invention also concerns a method of producing the outer carrier ring and the integrally formed flow splitter. According to the invention a machining tool is introduced through the lateral connection which is of the squattest possible shape and the tool is then fed along paths defined by progressively larger U-shaped loops.

If the extruder head is designed for the extrusion of two concentrically interposed tubes the front end of the die for extruding the inner tube will not be accessible during operation for a precise adjustment of the mandrel because this die is surrounded by the plastics stream forming the outer tube. In order to permit this mandrel to be nevertheless readjusted during operation another feature of the invention consists in mounting the mandrel roughly at the center of its length on at least three studs supported by the interior of the tube forming the shell of the die. Preferably the studs should have a cigar-shaped section in the direction of flow of the plastics stream and the tube forming the die may be slightly coned where the studs are located. This arrangement permits the rearward end of the mandrel to be precisely adjusted by adjusting screws in relation to the die tube and hence the end of the mandrel at the die orifice where the plastics stream is extruded to be adjusted to precise central alignment.

BRIEF DESCRIPTION OF THE DRAWINGS

In order to more fully illustrate the invention the following drawings are set forth. Referring to the drawings:

FIG. 1 is a longitudinal section of the entire extruder head which in this case is designed to extrude two concentrically interposed tubes, FIG. 2 is a section of the extruder head taken on the line II—II in FIG. 1, FIG. 3 is a section taken on the line III in FIG. 1, assuming the apparatus to be free of plastic material, FIG. 4 is a section taken on the line IV in FIG. 1, FIG. 5 is a section coplanar with the section of FIG. 1 of the outer carrier ring of the extruder head, FIG. 6 is a section of the outer carrier ring taken on the line VI—VI in FIG. 5, FIG. 7 is a view of the carrier ring insertion in position for fitting the same into the carrier ring in FIG. 5 from below, FIG. 8 is the carrier ring insertion according to FIG. 7, viewed from the right, FIG. 9 is the carrier ring insertion in FIG. 7, viewed from the left, and FIG. 10 is a section taken on the line X in FIG. 1.

DESCRIPTION OF SPECIFIC EMBODIMENTS

The extruder head shown in FIG. 1 is designed simultaneously to extrude an inner synthetic plastics tube 1 and an outer synthetic plastics tube 2, the outer tube in conventional manner being received into a traveling endless mold in which it is provided with transverse corrugations. An assembly for performing this function is in U.S. Pat. Nos. 3,776,679, and 3,751,541. The die 3 for extruding the inner synthetic plastics tube is a conventional straight tubular die assembly, whereas the die 4 for the extrusion of the outer tube, which is intended to be formed from say hard PVC, is part of a cross feed extruder head according to the invention, comprising an outer carrier ring 5 and an insertion 6 co-axially inside the ring and in facing position with respect to flow splitter 7. According to the invention the outer carrier ring 5 contains a flow splitter 7 which contains a dividing edge 8 facing the direction of flow of the stream of synthetic plastics. FIG. 3, in which it is assumed that the arrangement contains no plastics material, is a view through the lateral connection 9 of the dividing edge 8 of the flow splitter 7. FIG. 4 shows the plastics stream 10 after it has been divided by the flow splitter and in section assumed the shape of a U. With reference to FIGS. 5 and 6 it will be understood that the flow splitter 7 is integral with the carrier ring 5. The carrier ring 5 has a slightly coned internal surface 11 and the back 12 of the flow splitter 7 forms part of this coned internal surface. The insertion 6 is conformably externally coned and it is an exact fit in the outer carrier ring 5. It has a recessed surface 14 which on the side facing the flow splitter 7 embraces a backing face 13, and which is bounded by contoured edges which obliquely run around the insertion for guiding the two sides of the U-section plastics stream 10 until they recombine at a point 15 on the other side of the insertion to constitute an unbroken plastics stream of annular cross section.

In order to form the flow splitter 7 on the carrier ring 5 the lateral connection portion 9 of the carrier-ring is sufficiently squat to permit a tool to be introduced through the opening in the connection. This machining tool, as indicated by dashed lines in FIGS. 3, is fed along U-shaped paths, beginning at the dividing edge 8 with the shortest path and then progressively becoming larger in the inward direction. During this machining operation the insertion 6 is in position inside the carrier ring so that the same tool will also machine out the backing surface 13 of the insertion. When the flow splitter has thus been finish machined and polished, the insertion 6 is taken out of the ring and the recessed contoured surface 14 is machined. When both carrier ring and insertion have been finish machined the two parts are fitted together again and secured by screws 17. The stream of synthetic plastics material which flows against the dividing edge 8 operates to press the back 12 of the flow splitter 7 firmly against the backing surface 13 of the insertion so that there is no risk of plastics material undesirably penetrating the joint between the two surfaces 12 and 13. The back pressure is reduced by the flow splitter 7 sufficiently to permit even highly viscous synthetic materials which could not previously be extruded from obliquely or perpendicularly cross fed extruder heads without risk of the feeding pressures becoming excessive.

The extruder head according to the invention, as illustrated in the embodiment, is not merely suitable for extruding two concentrically interposed synthetic plastics tubes from highly viscous plastics materials, since it can also be used to provide cables and the like with an external sheathing. Moreover, the application of the proposed arrangement is not limited to highly viscous plastics materials since the pressure buildup can also be substantially reduced when extruding less viscous and more mobile synthetic plastics. Whereas in the case of the die 4 for extruding the outer plastics tube 2 the mandrel can be conveniently readjusted and realinged by three setting screws 21 during operation, this cannot be done in the case of the die for extruding the inner tube 1 because a considerable proportion of the length of this die is enveloped by the outer plastics stream and is therefore inaccessible during operation.

If it is desired to extrude an inner tube into an outer transversely corrugated tube for the purpose of providing the outer tube with a smooth internal surface offering minimal resistance to flow, then it is desirable that the wall thickness of this inner tube should be as thin as possible to avoid reducing the flexibility of the outer corrugated tube. However, particularly when extruding thin-walled tubes, a very precise adjustment of the internal mandrel of this die is imperative.

According to the present invention this requirement is satisfied in the proposed extruder head for extruding two interposed concentric tubes by mounting the mandrel 22 roughly in the middle of its length on studs 23 supported by the tubular wall of the inner die. Four such studs are provided in the illustrated embodiment and arranged in coplanar quadrature. It will be understood, more particularly by reference to FIG. 10, that the studs 23 are screwed or press fitted into blind holes in the mandrel 22 and the portion 24 of the studs projecting from the mandrel 22 is cigar-shaped in section in the direction of flow of the plastics. Where the mandrel is fitted with the supporting studs the surface of the die wall 3 is slightly coned and the end faces of the studs bearing against this wall are correspondingly ground to conform with this conicity. On the one hand this ensures that longitudinally the mandrel will be a perfect fit in the die wall 3 and that on the other hand when the extruding head is dismantled a slight retraction of the mandrel suffices to release the mandrel from the die. The die is adjusted by at least three adjusting screws 25 which screw into the rear end of the tubular die 3 and work against the peripheral surface of the mandrel 22. With the aid of these screws the annular die orifice for the inner plastics tube 1 can be precisely readjusted at any time during operation since the screws cause the mandrel to tilt about a fulcrum defined by the location of the supporting studs 23. The movements of the mandrel at the die orifice will therefore be directionally contrary to the movements impressed upon it by the screws 23. In conventional manner the mandrel 22 may be provided with a longitudinal central bore 26 for the introduction of supporting air into the interior of the extruded tube.

The possibility of adjusting the mandrel of an annular die is by no means confined to the employment of a cross feed head according to the invention. It may also be employed in cases in which a straight extruder head is rather long and the front end is not readily accessible for readjustment.

What is claimed is:

1. In an extruder head for extruding an outer tubular extrusion or sheath about an inner tube or cable comprising a means for passing an inner tube or cable through said extruder head, said extruder head terminating in a generally annular passage disposed about said inner tube or cable, the improvement which comprises means for feeding molten material through an introduction passage at an acute angle into said extruder head and thence into said annular passage, dividing means having the configuration of the portion remaining from a cone twice axially divided with tangentially adjoining inclined surfaces to form a leading parting edge, said dividing means being in said introduction passage for dividing said molten material into a stream of U-shaped cross section.

2. In an extruder head for extruding an outer tubular extrusion or sheath about an inner tube or cable comprising a means for passing an inner tube or cable through said extruder head, said extruder head terminating in a generally annular passage disposed about said inner tube or cable, the improvement which comprises means for feeding molten material through an introduction passage at an angle into said extruder head and thence into said annular passage, dividing means in said introduction passage for dividing said molten material into a stream of U-shaped cross section, said dividing means being a member having the configuration of the portion remaining from a cone twice axially divided with adjoining inclined lateral surfaces forming a leading parting edge, said extruder head having a carrier ring disposed generally coaxial with said annular passage, which carrier ring carries said dividing means and said carrier ring being in the form of a generally tubular member having a cone-shaped surface, said dividing means disposed exteriorly of said cone-shaped surface and forming a channel of U-shaped cross section.

3. An extruder head according to claim 2 wherein said carrier ring carries within the cone-shaped surfaces in nesting relationship therewith an insertion member.

4. An extruder head according to claim 3 wherein said insertion member is a grooved member having the configuration of a lateral section of a cone, said insertion member having a lateral wall defined by grooves which wall is in abutting relationship with said dividing means, said lateral wall being in the form of a U, the grooves on said insertion member extending circumferentially from the top of the legs of said U diagonally along the circumference to meet on the opposed side of the insertion member whereby a molten substance passing through said introduction passage and into the recessed area defined by said insertion member and the walls of said carrier ring flows to combine in the form of a ring shaped stream.

5. An extruder head according to claim 2 wherein said dividing means is integral with said carrier ring.

6. An extruder head according to claim 2 further comprising a tubular die and a mandrel, said die mounted about said mandrel to define an inner tube passage, said mandrel mounted generally centrally of its length by at least three studs to said tubular die, the interior of the tubular die being coned where it receives said studs, the rear end of said mandrel being adjustable in relation to said tubular die by at least three adjusting screws.

7. An extruder head according to claim 6 wherein each of said studs has a cigar-shaped cross section in the direction of flow.

8. An extruder head according to claim 2 wherein said introducing passage enters said extrusion head at an acute angle.

* * * * *